United States Patent
Smith et al.

[19]

[11] Patent Number: 5,999,092
[45] Date of Patent: Dec. 7, 1999

[54] ANTENNA CLUSTER FOR A MOTOR ROAD VEHICLE COLLISION WARNING SYSTEM

[75] Inventors: Graeme Peter Smith, Bishops Stortford; Eric Nicol Clouston, Cambridge, both of United Kingdom

[73] Assignee: Ford Motor Company, Dearborn, Mich.

[21] Appl. No.: 09/140,286

[22] Filed: Aug. 25, 1998

[30] Foreign Application Priority Data

Aug. 30, 1997 [GB] United Kingdom .................. 9718363

[51] Int. Cl.$^6$ ....................................... B60Q 1/00
[52] U.S. Cl. .................... 340/436; 340/903; 340/943; 342/71; 343/713
[58] Field of Search ............................ 340/436 OR, 901, 340/903, 933, 943; 342/70, 71, 158; 343/711, 713, 715

[56] References Cited

U.S. PATENT DOCUMENTS

| | | |
|---|---|---|
| 3,898,652 | 8/1975 | Rashid . |
| 5,008,678 | 4/1991 | Herman ...................................... 342/70 |
| 5,235,316 | 8/1993 | Qualizza ................................. 340/436 |
| 5,734,336 | 3/1998 | Smithline ............................... 340/436 |
| 5,905,457 | 5/1999 | Rashid ..................................... 342/71 |

*Primary Examiner*—Daniel J. Wu
*Attorney, Agent, or Firm*—Mark Mollon

[57] ABSTRACT

A motor vehicle collision warning system 1 comprises an obstacle sensing system 3 including a plurality of sensors 5 together capable of sensing obstacles around the vehicle 7 and generating obstacle of concern signals when obstacles are sensed, and a warning control system 9 for receiving the obstacle of concern signals and for determining whether a collision warning signal should be generated. The sensing system includes at least one antenna cluster 11 mounted in the region of a corner 13 of the vehicle 7, the antenna cluster 11 comprising a radar transmit antenna 15 and two receive antennas 17 and 19. The transmit antenna 15 is mounted between the receive antennas 17 and 19. Receive antenna 17 faces towards the front of the vehicle and receive antenna 19 faces towards the rear of the vehicle. A trigger means 21 triggers the operation of the transmit antenna 15 and one or both of the receive antennas 17 and 19.

5 Claims, 7 Drawing Sheets

ANTENNA CLUSTER FOR A MOTOR ROAD VEHICLE COLLISION WARNING SYSTEM

BACKGROUND OF THE INVENTION

This invention relates to collision warning systems for motor vehicles and in particular to an antenna cluster for use in such a collision warning system.

Various different types of collision warning systems have been proposed for motor vehicles which will warn of potential collision with moving targets, primarily other vehicles and stationary obstacles especially when parking. Such systems include "closing vehicle same lane warning systems" for looking behind a vehicle when it is traveling forwards for noting when a vehicle is approaching from the rear; parking aids for looking forwards when the vehicle is traveling slowly forwards and backwards when the vehicle is traveling slowly backwards; backup aids; short range frontal collision warning systems for looking ahead of the vehicle while driving forwards; parking space measuring aids for measuring the length of a parallel parking space to the side of the vehicle; driver induced impaired visibility aids to help ensure that the driver can notice vehicles approaching his side in an overtaking lane; side vision aids for looking to the side of the vehicle; and lane change aids for checking that the driver is free to overtake, or indeed move to an inside lane.

Typically these have all been designed as discrete packages and so a vehicle having a multiplicity of these aids includes a plurality of sensors of different types and ranges looking around the vehicle.

There are many different types of sensors available including radar and ultrasound sensors which are chosen depending upon the range required for the sensor. The majority of sensor types transmit a signal which is reflected from an obstacle and then received. Measurement of the time delay between transmission and receipt of the signal allows the position of the obstacle to be calculated.

The common features of the above collision warning systems are that they include a sensing system, which has at least one sensor with a field of view in which it may detect an obstacle, and a warning control system which receives "obstacle of concern" signals from the sensor and analyzes them to determine whether a collision warning signal should be generated. However, for each application and at any one time only obstacles in a particular area, known as the zone of concern, are of particular interest. For example, in the parking aid system, as the vehicle moves forward the area to the front and sides of the vehicle is the zone of concern. During reversing, the rear of the vehicle is of primary concern.

A collision warning system for a motor vehicle which is capable of acting as a multifunctional system is described in the applicants previous PCT application PCT/GB97/01728 in which each of the plurality of sensors has a predetermined field of view in which it is capable of detecting obstacles and an instantaneous field of view within which obstacles sensed by the sensor causes the obstacle sensing system to generate an obstacle signal. A vehicle operation sensing means detects at least one property of the vehicle's operation. A zone of concern control means defines a zone of concern within which sensed obstacles trigger the generation of an obstacle of concern signal whereby the zone of concern is defined in dependence on the property or properties of the vehicle's operation sensed by the vehicle operation sensing means. The zone of concern control means controls the sensors such that the instantaneous field of view of the sensors together cover the zone of concern.

The foregoing system includes four sensors which each comprise a transmitter antenna and a receiver antenna. The present invention relates to an antenna cluster especially suitable for use in such a system.

SUMMARY OF THE INVENTION

The present invention achieves a motor vehicle collision warning system comprising an obstacle sensing system. A plurality of sensors together capable of sensing obstacles around the vehicle generate obstacle of concern signals when obstacles are sensed. A warning control system receives the obstacle of concern signals and determines whether a collision warning signal should be generated. The sensing system includes at least one antenna cluster mounted in the region of the corner of the vehicle, the antenna cluster comprising a radar transmit antenna and two receive antennas. The transmit antenna is mounted between the receive antennas. A first receive antenna faces towards the front of the vehicle and a second receive antenna faces towards the rear of the vehicle. Trigger means triggers the operation of the transmit antenna and one or both of the receive antennas.

Preferably the antennas transmit and receive impulse radar signals since these provide a wide coverage. A single impulse radar sensor enables a wide field of view (up to 270° when mounted on the corner of a vehicle) but with no angular discrimination facility.

Preferably the sensing system operates by interpolating the data from two or more receive antennas to locate the target in two dimensions and therefore pinpoint its position accurately. Preferably therefore the system includes a plurality of antenna clusters, each cluster including a transmit and two receive antennas.

It has been found that efficient coverage of the area about the vehicle may be achieved by the use of 4 antenna clusters, one at each corner of the vehicle.

Preferably the system includes a scanning timer which operates the antenna transmit and receive antennas in a timed scheduled order.

Preferably each scan comprises transmitting a signal from one transmit antenna and receiving the signal from three receive antennas.

Typically each scan will last in the region of 25 ms.

The selection of the transmit and receive antenna combination to be operated at any one time is dependent upon the zone of concern. Thus, instead of scanning through all possible combinations of the antennas to receive an all around view of the vehicle, only a selected region of the vehicle is viewed.

Alternatively the scanning around the vehicle may continue, but the control system of the sensors will only act upon obstacles found in the zone of concern.

DETAILED DESCRIPTION OF PREFERRED EMBODIMENTS

Figure 1:
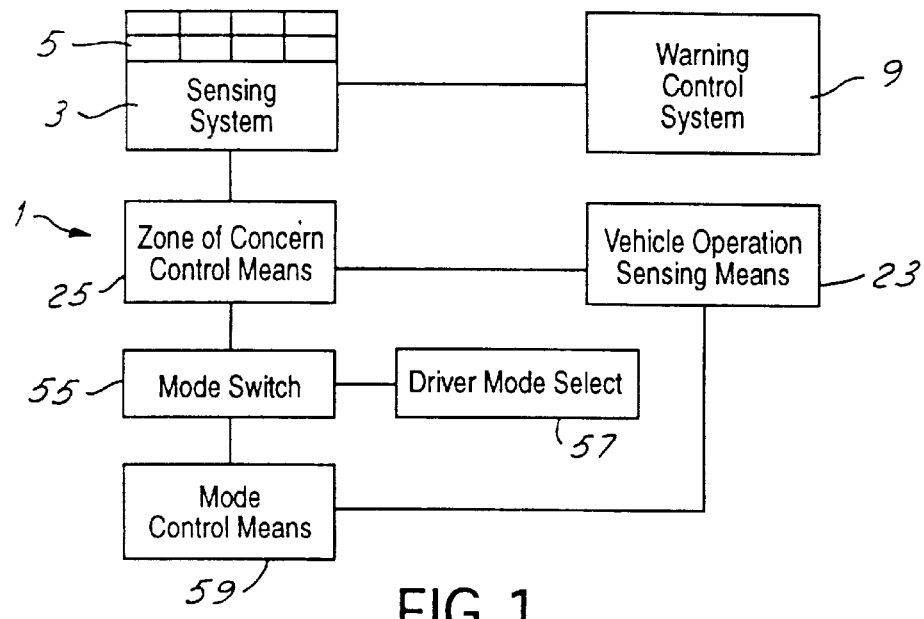
FIG. 1 is a block diagram of the key components in the system.
Figure 8:
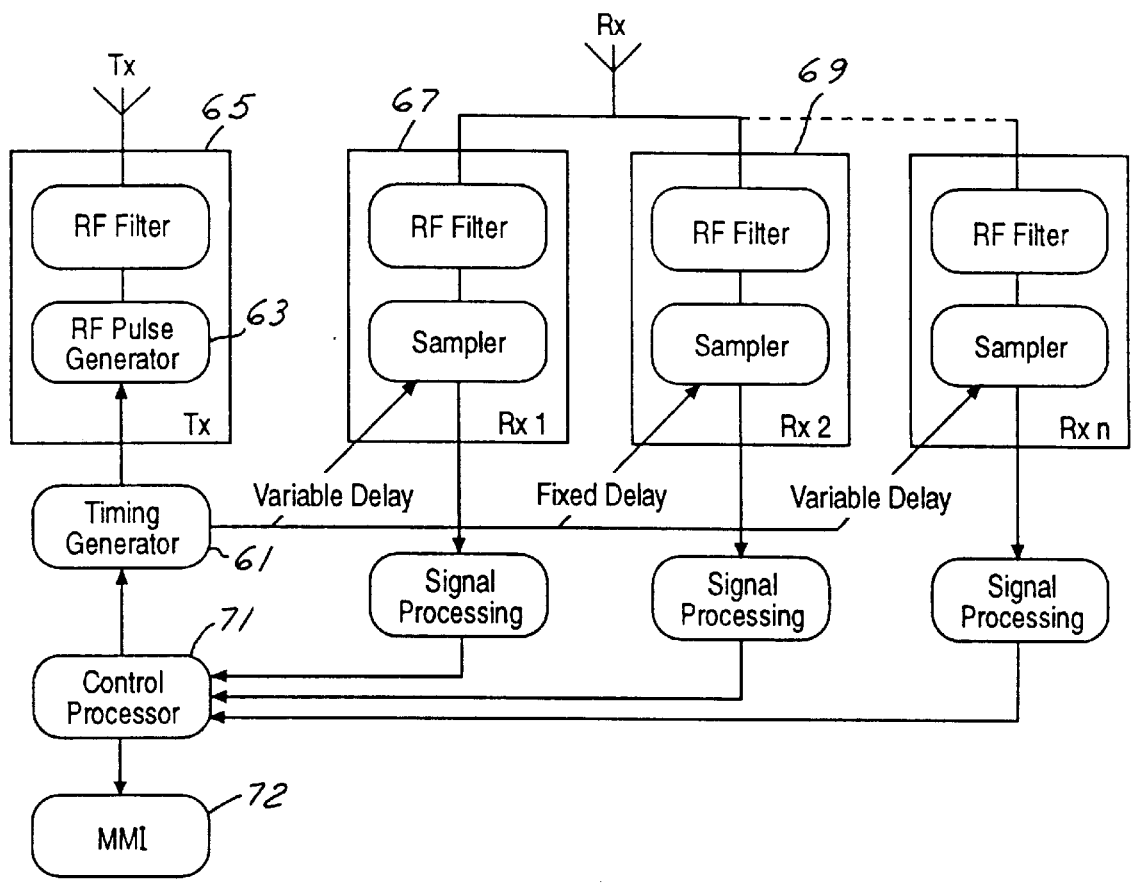
FIG. 8 is a block diagram of the radar system.

Referring to the Figures, a motor vehicle collision warning system 1 comprises an obstacle sensing system 3, comprising a plurality of sensors 5 together capable of sensing obstacles around a vehicle 7 and generating obstacle of concern signals when obstacles are sensed. A warning control system 9 receives the obstacle of concern signals and determines whether a collision warning signal should be generated. The sensing system includes at least one antenna cluster 11 mounted in the region of a corner 13 of vehicle 7. Antenna cluster 11 includes a radar transmit antenna 15 and two receive antennas 17 and 19. The transmit antenna 15 is mounted between the receive antennas 17 and 19. First receive antenna 17 faces towards the front of the vehicle and second receive antenna 19 faces towards the rear of the vehicle. Trigger means 21 within central control 53 triggers the operation of transmit antenna 15 and one or both of the receive antennas 17 and 19.

The collision warning system is as described in PCT application PCT/GB97/01728 in which each of said plurality of sensors 5 has a predetermined field of view in which it is capable of detecting obstacles and an instantaneous field of view within which obstacles sensed by the sensor causes the obstacle sensing system 3 to generate an obstacle signal. The collision warning system also includes a vehicle operation sensing means 23 for detecting at least one property of the vehicle's operation. A zone of concern control means 25 defines a zone of concern within which sensed obstacles trigger the generation of an obstacle of concern signal. The zone of concern is defined in dependence on the property or properties of the vehicle's operation sensed by the vehicle operation sensing means 23. The zone of concern control means controls the sensors such that the instantaneous field of view of the sensors 5 together cover the zone of concern.

Figure 3:
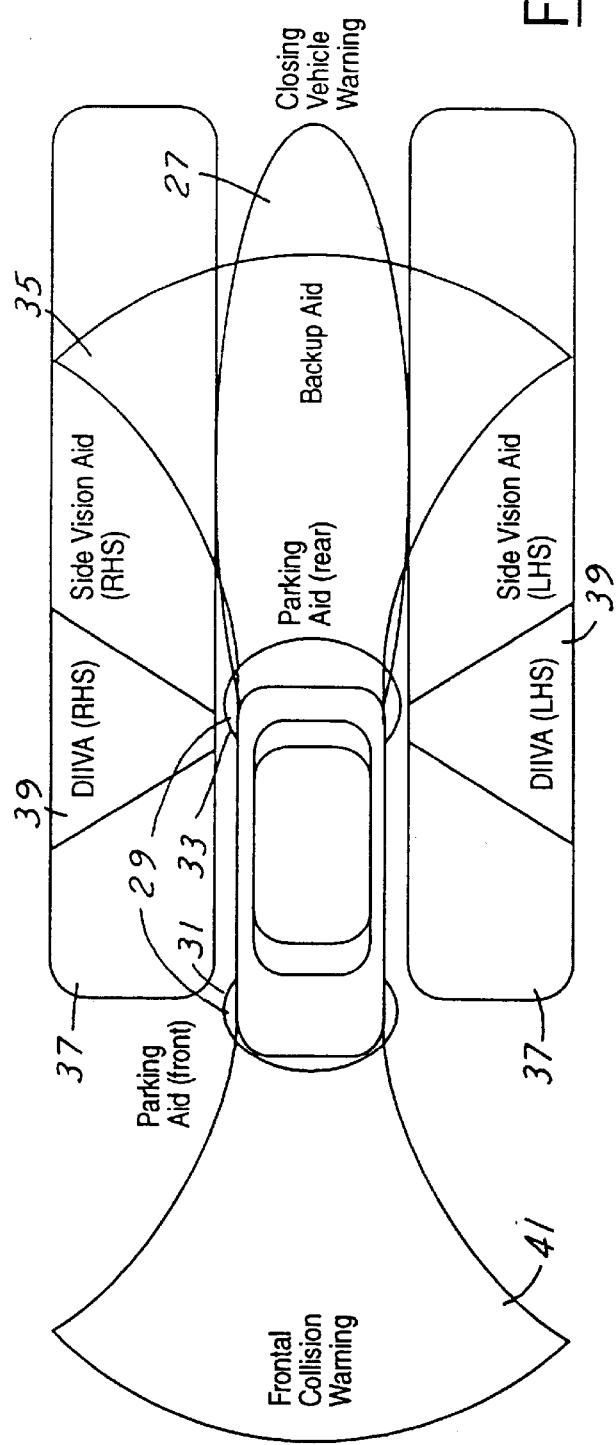
FIG. 3 is a diagram illustrating the zone of concern for specific modes of operation of the system.

FIG. 3 illustrates the zones of concern about the vehicle in which, in particular modes, the presence of an obstacle should generate a warning signal. Throughout these zones of concern the preferred elevation coverage will be from about 0.15 m up to the height of the vehicle. Clearly, objects above this height such as bridges may be ignored.

The zone of concern 27 for the closing vehicle same lane system covers the lane width within which the vehicle travels, usually 3.7 m and extends 30 m to the rear of the vehicle. The zone of concern 29 for the parking aid is in two areas 31 and 33 to the front and rear of the vehicle respectively. The area 31 to the front of the vehicle extends 0.6 m to the front of the vehicle and 0.5 m to each side, and the rear area 33 extends 1.5 m to the rear for a car, but would be 3 m for a van, and extends 0.5 m to each side of the vehicle.

The zone of concern 35 for a backup aid extends 10 m to the rear and is wider than the vehicle allowing for turning of the vehicle.

The side vision aid zone of concern 37 extends from the wing mirror (not shown) of the vehicle to the rear by 12 m and a lane width to each side.

The zone of concern 39 for the Driver Impaired Visibility Aid is to the side only of the vehicle and a subpart of the zone of concern 37 of the side vision aid.

The zone of concern 41 for the frontal collision warning extends 10 m to the front of the vehicle and extends wider than the vehicle to allow for turning of the vehicle.

Figure 4:
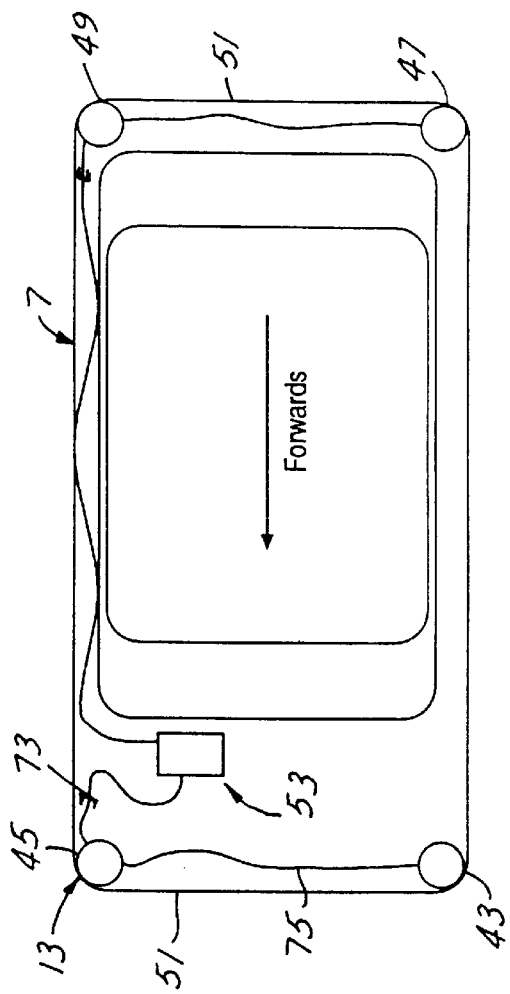
FIG. 4 is a schematic plan of a vehicle illustrating the antenna cluster position.

The layout of antenna clusters 11 is illustrated in FIG. 4 which shows four clusters 43, 45, 47 and 49 each mounted inside the bumpers 51 of the vehicle. Each is part of the sensing system 3. Each antenna cluster comprises a transmit antenna (Tx1, Tx2, Tx3 and Tx4) and two receive antennas (Rx1 to Rx8). The front left unit 43 comprises transmit antenna Tx3 mounted between front facing receive antenna Rx3 and rear facing receive antenna Rx7. The front right unit 45 comprises transmit antenna Tx4 mounted between front facing receive antenna Rx4 and rear facing receive antenna Rx8. The rear left unit 47 comprises transmit antenna Tx2 mounted between front facing receive antenna Rx6 and rear facing receive antenna Rx2. The rear right unit 49 comprises transmit antenna Tx1 mounted between front facing receive antenna Rx5 and rear facing receive antenna Rx1. A central unit 53 includes a power supply for the sensors and houses trigger means 21 to trigger the operation of the sensors of the antenna clusters.

Figure 5:
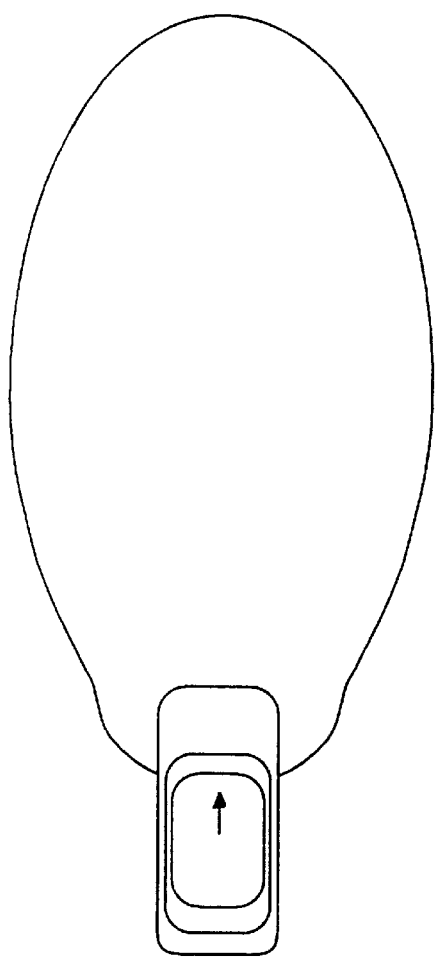
FIG. 5 is a diagram illustrating the instantaneous field of view of one sensor.
Figure 6:
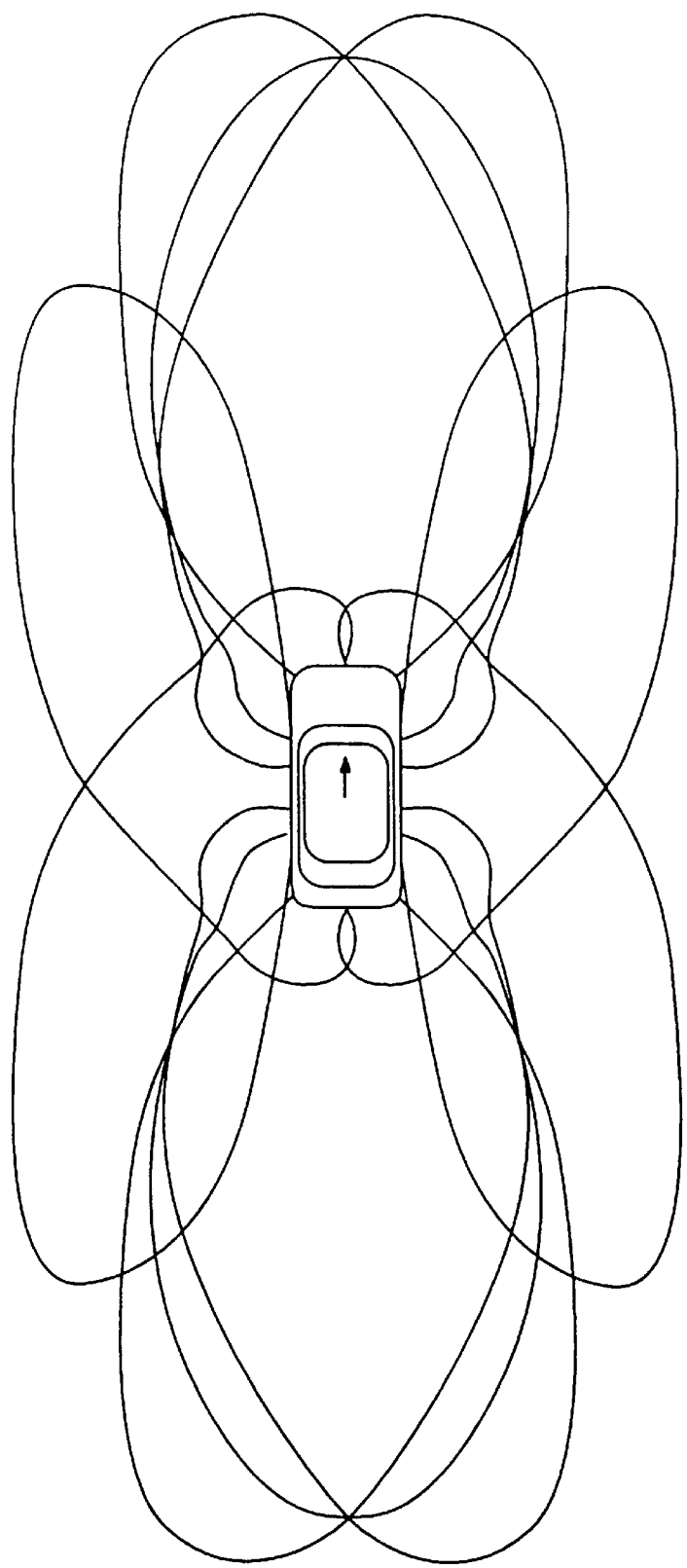
FIG. 6 is a view of the whole field of view of the sensing system.

FIG. 5 illustrates the instantaneous field of view of transmit antenna Tx3 when its signal is received by receive antenna Rx4. Referring to FIG. 6, it can be seen that by use of different transmit/receive combinations a series of overlapped areas are created within which at least two antenna pairs can detect the obstacle.

Figure 7:
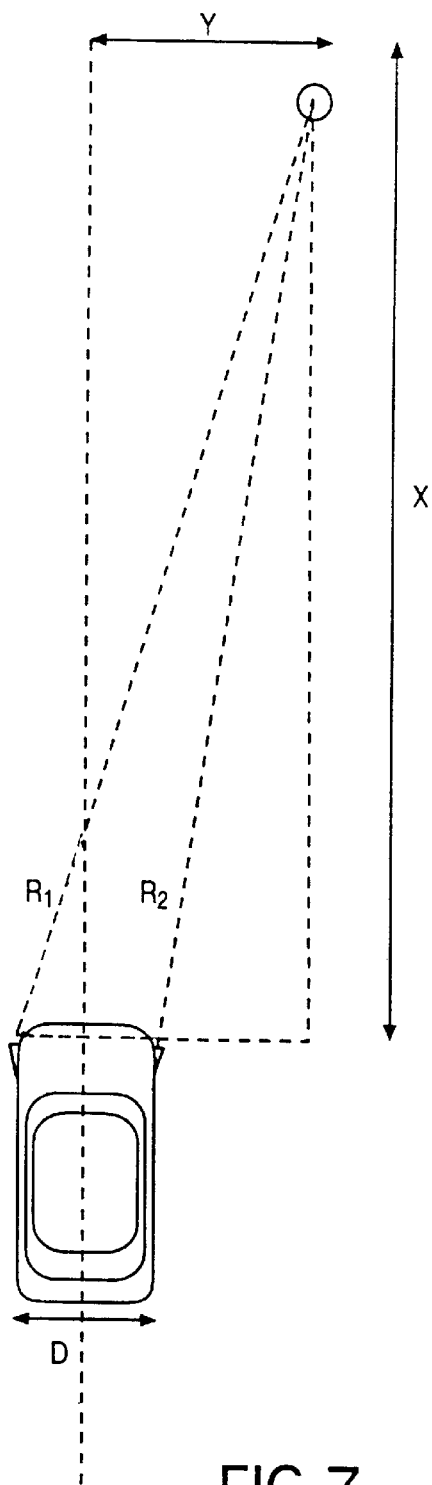
FIG. 7 is a schematic view illustrating calculation of an obstacle's position.

As can be seen in FIG. 7, if the range from one sensor R1 is known, and the range from second sensor R2 is also known, together with the distance between the two sensors D, this can be used to plot the coordinates X and Y of the obstacle.

Figure 2:
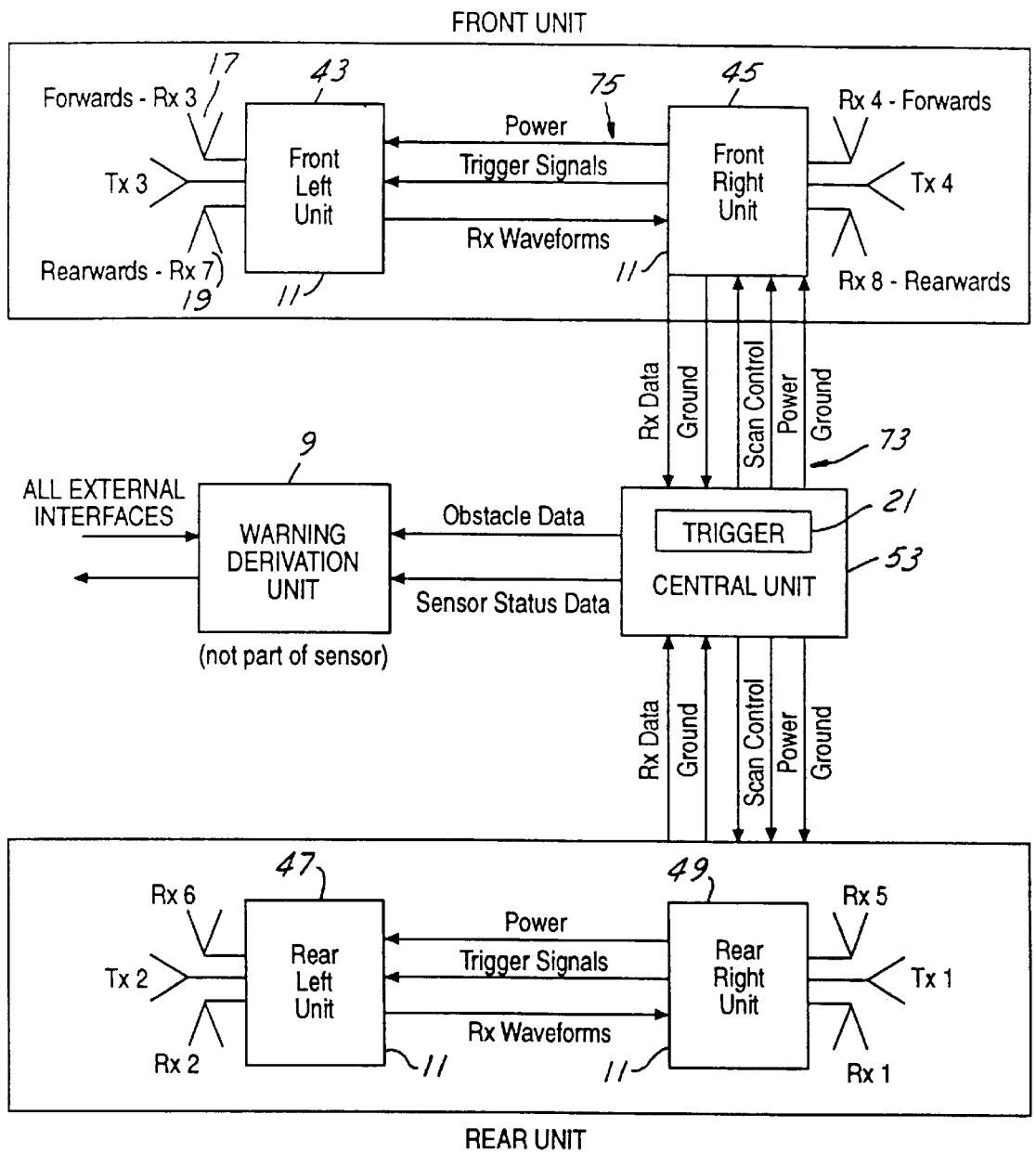
FIG. 2 is a block diagram of the antenna clusters of the system.

The system is a multifunctional system capable of operating in all the modes set out and shown in FIG. 2. As can be seen in FIG. 6, the field of view of all the sensors allows all the zones of concern to be covered.

The system also includes mode switch 55 which is coupled to driver select control 57 allowing the selection of a mode of operation, for example if the driver is about to park. It is also coupled to mode control means 59 which receives signals from the vehicle operation sensing means 23 to determine the type of sensing mode required. For example, selection of reverse gear would trigger reversing aid, while a forward gear and the selection of the indicator would trigger the side vision aid. Driving at speeds of over 5 m.p.h. in a forwards direction would trigger the Closing Vehicle Same Lane Aid and the Frontal Collision Warning Aid. These operate at the same time. Whilst these are in operation, a display (not shown) indicates to the driver which aid is in operation.

The parking aid is triggered only by selection by the driver using the driver select control 57.

The sensors are impulse radar sensors and each transmit antenna Tx transmits a series of pulses. The transmitted signal is in the form of a short radio frequency pulse, typically of 0.1 to 5 nanoseconds duration depending on the rise time and the frequency response characteristics of the antenna.

The pulses are similar to those generated by the system shown in published application WO 90/13048. The transmission of pulses by an antenna is initiated by a timing generator 61 which triggers a transmit generator 63 of a transmitter 65 connected to the transmit antenna Tx.

The timing generator is also connected to two gating devices 67 and 69 which are, in turn, both connected to a receive antenna Rx. Each of the gating devices, in response to a signal from the timing generator 61 samples the signals received by the antenna Rx.

The outputs from the gating devices are connected to a control processor 71 which analyzes the signal to determine whether or not to initiate an alarm through a man-machine interface 72.

The processor 71 is also connected to a motion sensor (not shown) which measures the speed with which the car is moving, and to the vehicle control system.

In use, the timing generator 61 causes a selected one of the gating devices to sample the output of the receive antenna Rx at a predetermined delay (normally of 1 to 200 nanoseconds corresponding to 15 cm to 30 m) after transmission of a given pulse by transmit antenna Tx. If the antenna Rx receives the reflection of the pulse during a given sampling period, this is indicative of the transmit pulse having traveled from the transmit antenna Tx to a reflecting surface and back to the receive antenna Rx in the delay between the transmission of the pulse and sampling period.

In this case, the timing generator triggers the gating device of three receive antennas Rx so that signals received by more than one antenna can be used to accurately pinpoint an obstacle as illustrated in FIG. 7.

The transmit and receive antennas are triggered in a repeated sequence of four scans, each 25 ms long. Only one transmit antenna Tx is used in each scan, but three receive antennas are used at the same time, as shown in the table below.

| Antenna | Front/Rear | Left/Right | Forwrd/Rearwd | Scan 1 | Scan 2 | Scan 3 | Scan 4 |
|---|---|---|---|---|---|---|---|
| Tx1 | Rear | Right | Both | X | | | |
| Tx2 | Rear | Left | Both | | | X | |
| Tx3 | Front | Left | Both | | X | | |
| Tx4 | Front | Right | Both | | | | X |
| Rx1 | Rear | Right | Rearwd | X | | X | |
| Rx2 | Rear | Left | Rearwd | X | | X | |
| Rx3 | Front | Left | Forwrd | | X | | X |
| Rx4 | Front | Right | Forwrd | | X | | X |
| Rx5 | Rear | Right | Forwrd | X | | | |
| Rx6 | Rear | Left | Forwrd | | | X | |
| Rx7 | Front | Left | Rearwd | | X | | |
| Rx8 | Front | Right | Rearwd | | | | X |

Each scan consists of a Transmit pulse being transmitted by a transmit antenna, for example Tx1, the timing generator generating a time delay and then sampling the signals received by three of the receive antennas, for example, Rx1, Rx2 and Rx5.

The front unit is mounted in the front bumper (not shown) with a single external connector 73 on the right hand side, for connection to the central unit 53. It includes the front right unit 45 and the front left unit 43. The front right unit 45 is directly connected to a cluster of three antennas—a transmit antenna Tx4, a forward facing receive antenna Rx4 and a rearward facing receive antenna Rx8. The front left unit 43 is similarly connected to another three antennas, Tx3, Rx3 and Rx7.

The connector 73 is a single multiway connector which feeds power and a scan control signal to both the front units and outputs from the front units detected obstacle data as a digital data stream.

Connections 75 between the front right unit 45 and the front left unit 43 are within the bumper. Once assembled, these connections are not accessible. The connection 75 is a screened multiway connection consisting of power, ground, Tx3 Trigger, and Rx7 and Rx3 trigger all going to unit 43) and the detected outputs from samplers (coming from unit 43).

The central unit 53 receives power from the vehicle 12V system and generates regular power for both front and rear units at +5.0 v and −5.0 v. It receives power only when the ignition is in the run position.

The RF electronics within the units are connected to the antennas by connections within the bumper, which are radio frequency connections.

Each transmit antenna Tx is a dual beam antenna to front and rear with a band of operation of 5.46 to 7.25 GHz. Each receive antenna Rx receives signals in the same frequency range, but is a single beam to the front or rear at 15° relative to the center line of the vehicle.

The scan control signal (front) is a 20 Hz square wave which selects the transmitter Tx4 on the right hand side (rhs) and the transmitter Tx3 on the left hand side (lhs) on alternate scans—positive going edge initiates a scan on the lhs and the negative going edge initiates a scan on the rhs.

When the rhs transmitter Tx4 is used, the rhs rearward facing receiver Rx8 is selected and the lhs rearward facing receiver Rx7 is not. When the lhs transmitter Tx3 is used, the lhs rearward facing receiver Rx7 is selected and the rhs rearward facing receiver Rx8. The forward facing receivers Rx3 and Rx4 are both selected for either transmitter.

The sampler timing is set to give the following nominal scans:

| Sampler | Min Range | Max Range | Scan length |
|---|---|---|---|
| 1 | (−2.344 m) | 2.344 m | 4.69 m |
| 2 | 2.344 m | 7.031 m | 4.69 m |
| 3 | 7.031 m | 11.719 m | 4.69 m |
| 4 | 11.719 m | 16.406 m | 4.69 m |

Figure 9:
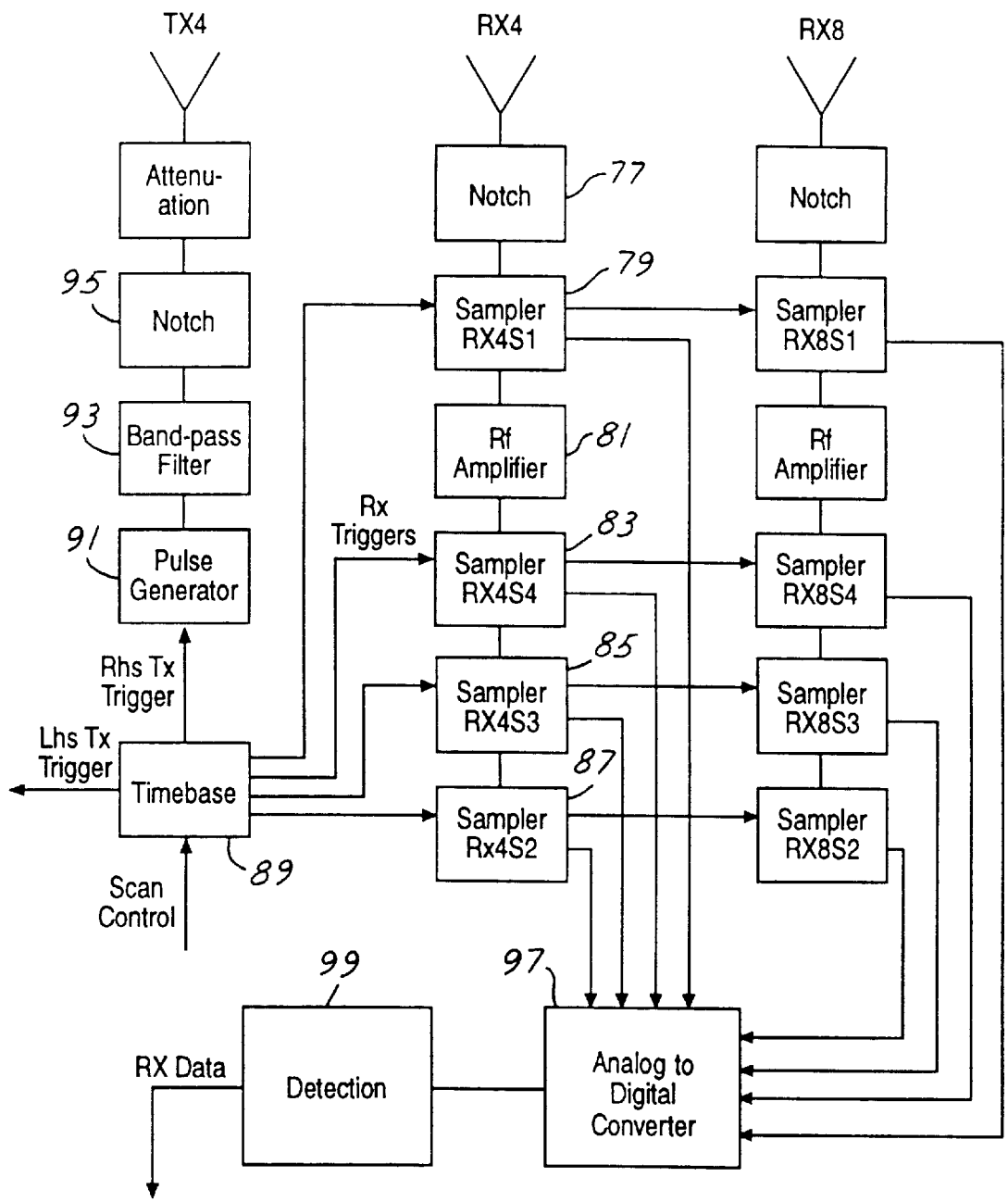
FIG. 9 is a block diagram showing the front right antenna cluster in greater detail.
Figure 10:
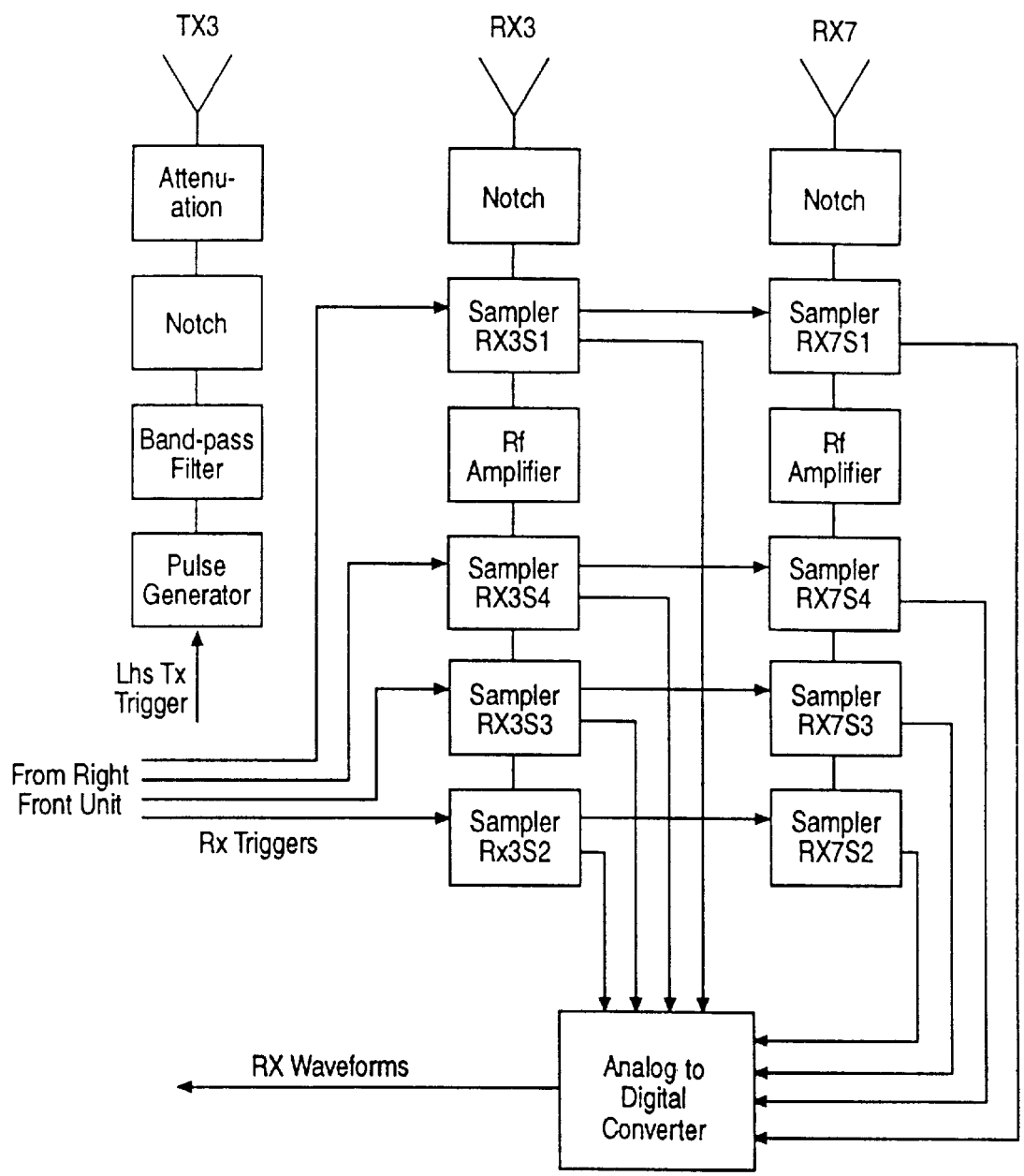
FIG. 10 is a block diagram showing the front left antenna cluster in greater detail.

As can be seen in FIGS. 9 and 10, connected to each Receive antenna Rx is a chain of four samplers. Only one chain will be described as an example. This is the chain connected to Rx4. The antenna is connected to a protection notch circuit 77 to cut off at a peak of less than IV, which in turn is coupled to first sampler 79. Signals from the first sampler 79 are fed through an rf amplifier 81 with a gain of over 10.5 mB to an array of three samplers 83, 85 and 87.

The timebase 89 (part of the timing generator) generates a Tx trigger signal and four Rx trigger signals for each side of the front unit. The scan control (front) signal initiates each scan. The Tx trigger signal is fed to pulse generator 91 which generates an impulse radar signal via filter 93 and protection notch circuit 95. The Rx trigger signals are generated at time delays corresponding to the scan lengths required for each sampler. This is typically at 31.25 ns time intervals.

Signals from the scanners are fed via an analog-to-digital converter 97 to detection means 99 which feeds data to central unit 53.

The rear unit is identical to the front unit but is mounted in the rear bumper. Also the Scan control (rear) signal is offset by 25 ms from the Scan control(front) signal.

What is claimed is:

1. A motor vehicle collision warning system comprising:

an obstacle sensing system including a plurality of sensors together capable of sensing obstacles around said vehicle and generating obstacle of concern signals when obstacles are sensed, and a warning control system for receiving said obstacle of concern signals and for determining whether a collision warning signal should be generated;

wherein said plurality of sensors includes at least one antenna cluster mounted substantially at a corner of said vehicle, said antenna cluster comprising a transmit antenna and first and second receive antennas, said transmit antenna mounted between said receive antennas, said first receive antenna facing towards the front of said vehicle and said second receive antenna facing towards the rear of said vehicle.

2. The collision warning system according to claim 1 wherein said plurality sensors includes a plurality of antenna clusters, each cluster including a transmit and two receive antennas.

3. The collision warning system according to claim 2 including four antenna clusters, one at each corner of said vehicle.

4. The collision warning system according to claim 1 further comprising a scanning timer which operates said transmit and receive antennas in a timed scheduled order.

5. The collision warning system according to claim 4 wherein each scan comprises transmitting a signal from one transmit antenna and receiving signals from three receive antennas.

* * * * *